Oct. 29, 1968 F. E. HEIBERGER 3,407,724
POWER PRESS ACCELERATION CONTROL SYSTEM
Filed Feb. 28, 1967 7 Sheets-Sheet 1

INVENTOR
FRANCIS E. HEIBERGER
by: Wolfe, Hubbard, Voit
& Osann ATTYS.

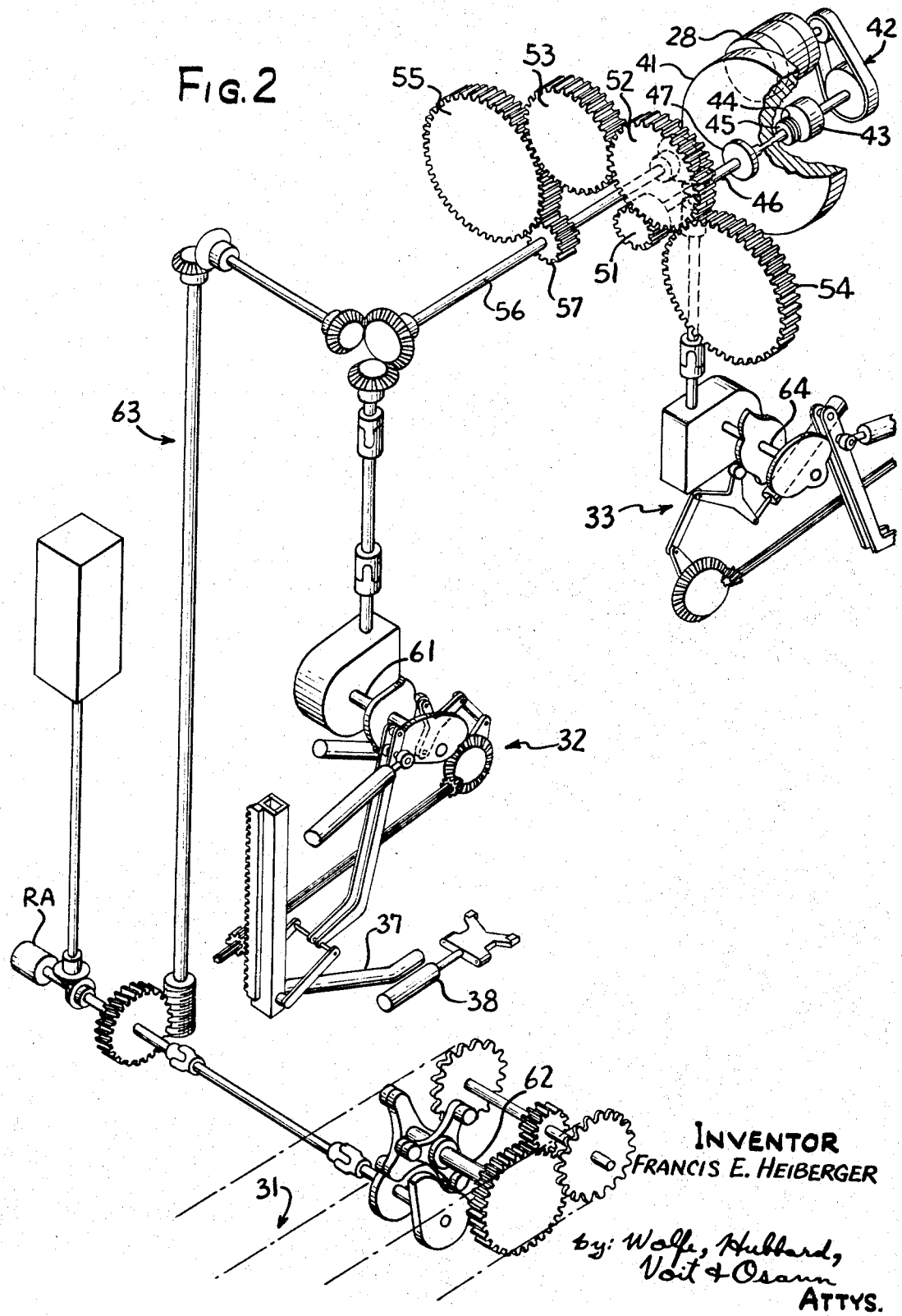

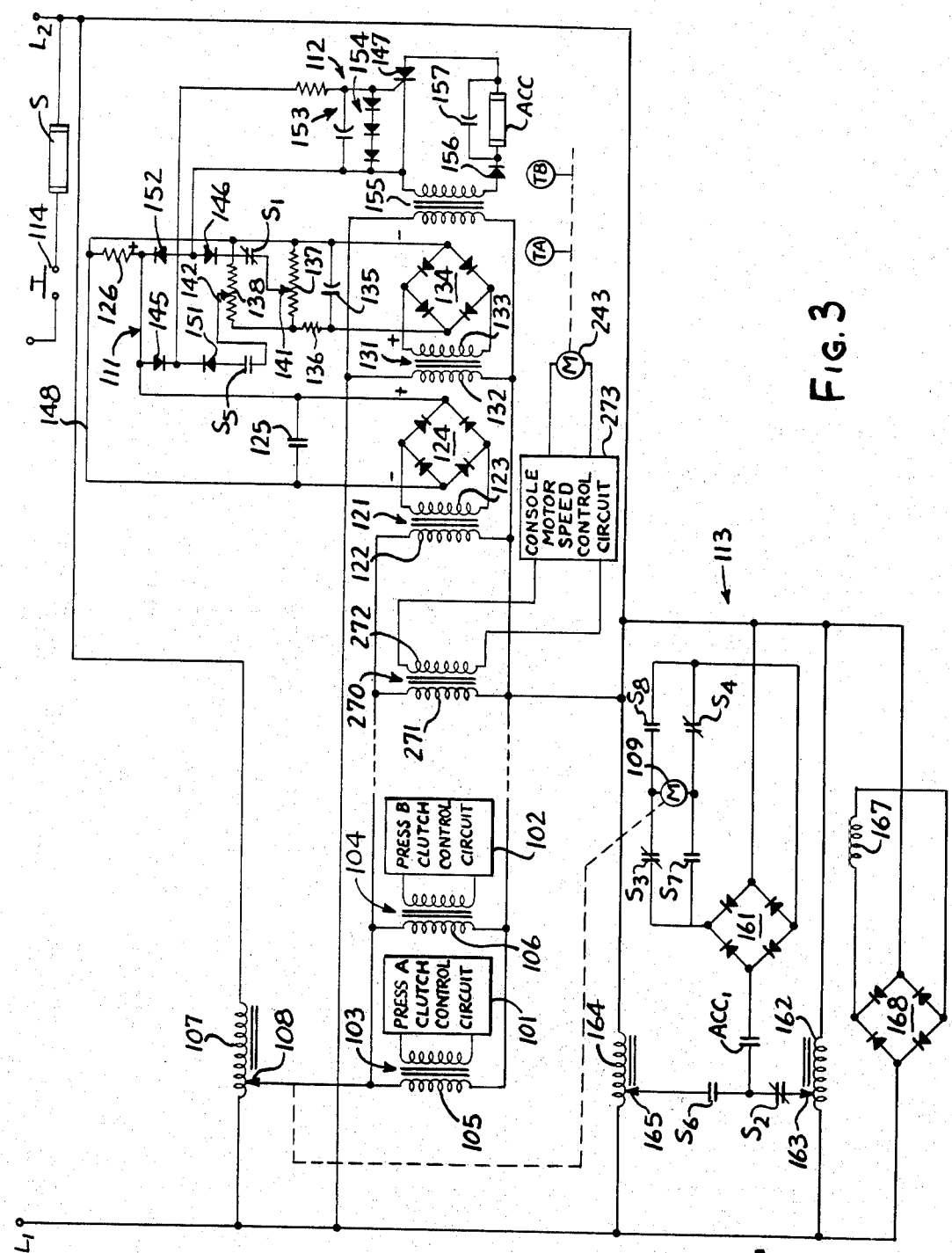

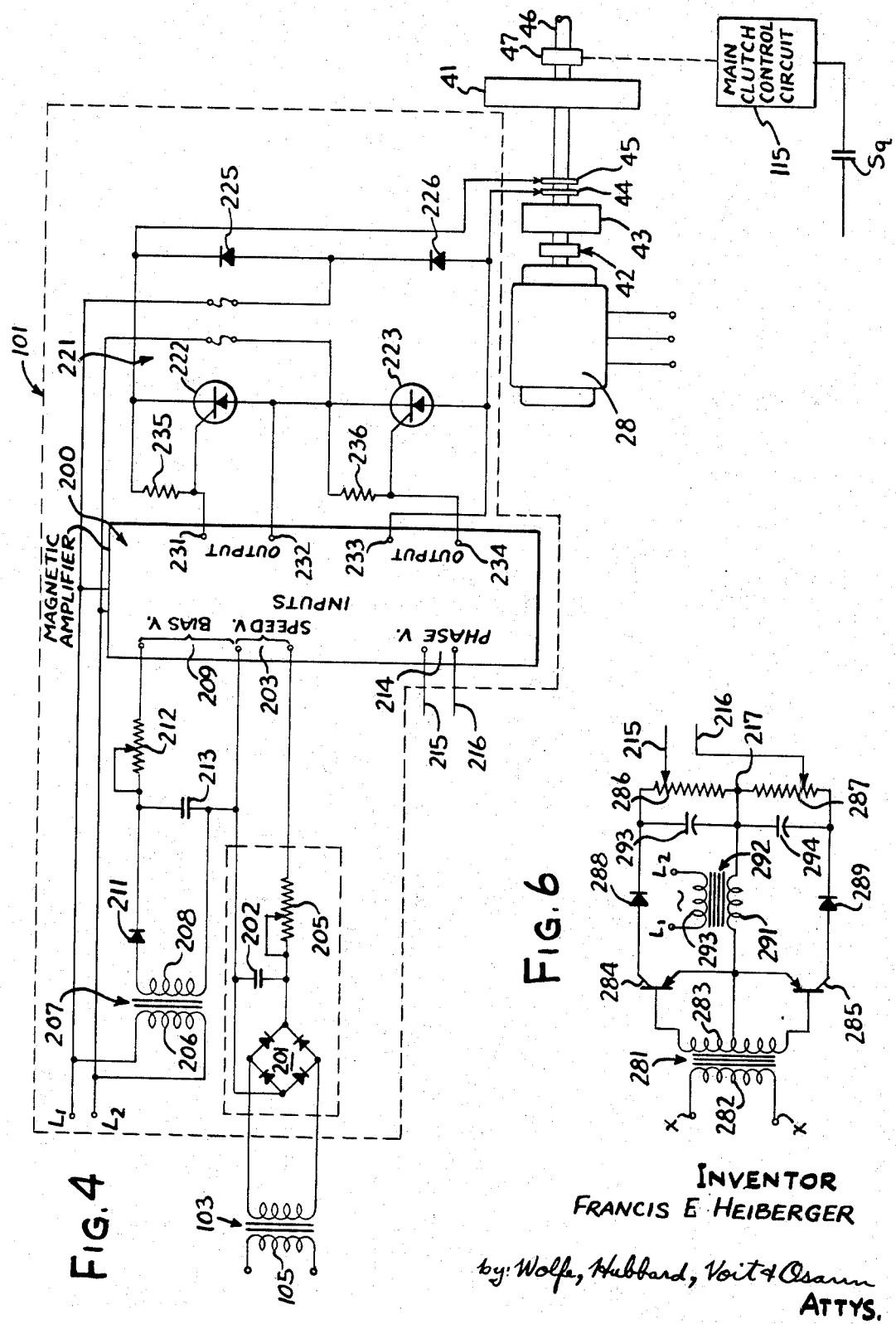

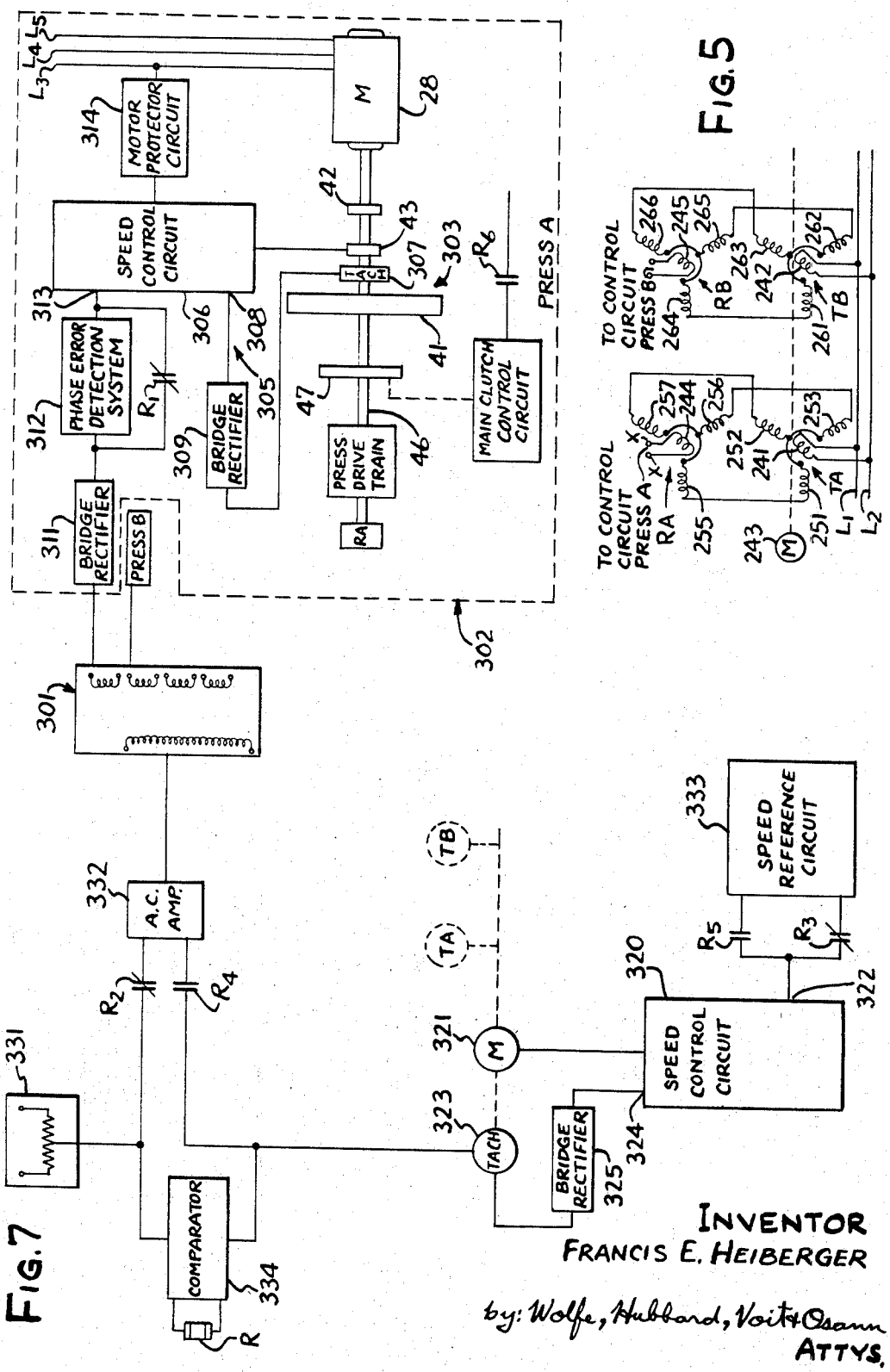

Oct. 29, 1968  F. E. HEIBERGER  3,407,724
POWER PRESS ACCELERATION CONTROL SYSTEM
Filed Feb. 28, 1967  7 Sheets-Sheet 6
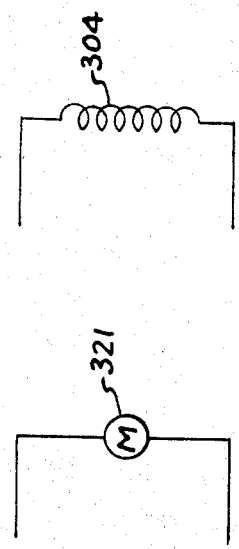
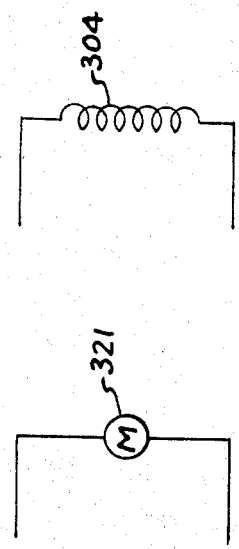
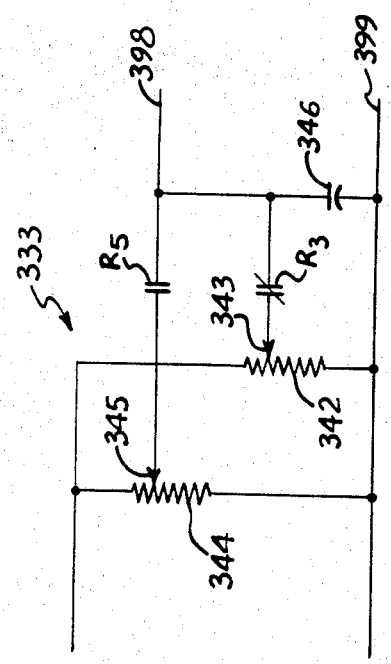
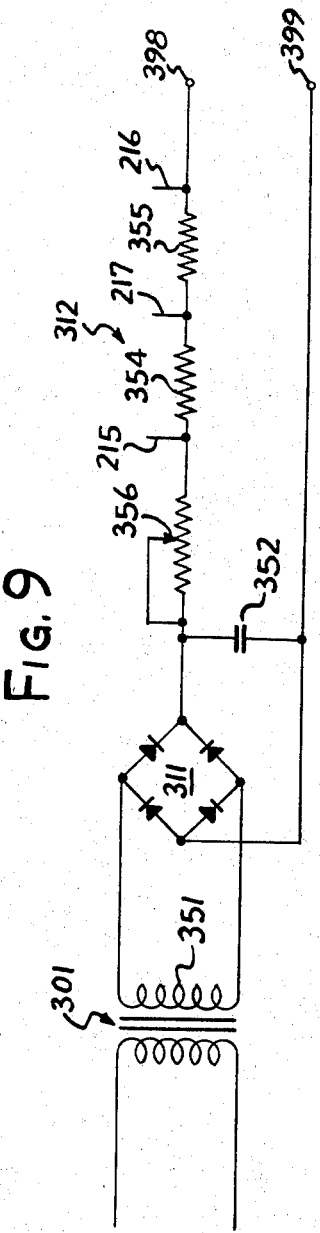
INVENTOR
FRANCIS E. HEIBERGER
by: Wolfe, Hubbard, Voit & Osann
ATTYS.

INVENTOR
FRANCIS E. HEIBERGER
by: Wolfe, Hubbard, Voit & Osann
ATTYS

United States Patent Office 3,407,724
Patented Oct. 29, 1968

3,407,724
POWER PRESS ACCELERATION
CONTROL SYSTEM
Francis E. Heiberger, Elmhurst, Ill., assignor to Danly
Machine Corporation, Chicago, Ill., a corporation of
Illinois
Filed Feb. 28, 1967, Ser. No. 619,216
14 Claims. (Cl. 100—43)

ABSTRACT OF THE DISCLOSURE

An acceleration control system for a single power press or a synchronized line of power presses for electrically controlling the transmission of torque from the press drive motor or motors to the press flywheel or flywheels to automatically limit the starting speed of the press or presses to a relatively low level at which the resulting starting shock is not sufficiently severe to create any significant probability of damage to the press components and to subsequently automatically and controllably accelerate the press or presses to a higher operating speed.

BACKGROUND OF THE INVENTION

The present invention relates to power presses and, more particularly, to an acceleration control system for power presses.

The modern power press includes transfer mechanisms for automatically and in synchronism with the press slide providing a workpiece from a conveyor or the like on the input side of the press and for removing the workpiece to a conveyor or other depository on the output side of the press. But, problems have been encountered in the design of these presses. For example, no practical transfer mechanism has been suggested which can reliably successfully withstand the high applied shock attendant to starting the press at the desired press operating speed, typically 15 strokes per minute or higher. Additionally, particularly where relatively heavy workpieces are involved, the starting inertia associated with the conveyors can lead to damage of the conveyor drive motor and press clutch if the press is started at too great a speed. Furthermore, recent years have seen the development of sophisticated press lines where a workpiece blank is automatically and synchronously fed through a bank of presses to be withdrawn as a finished product. A serious complication of the aforementioned problems has accompanied the advent of such lines since the multiplication of the number of presses involved is attended by a similar multiplication of the number of parts which are subject to damage by starting at desirable operating speeds.

Accordingly, it is an object of this invention to provide an automatic control system for reducing the starting shock applied to a power press. A more detailed object it to provide a control system for automatically governing the acceleration of a power press from a relatively low starting speed to a considerably higher operating speed.

Another object of this invention is the provision of a system which automatically provides a controlled acceleration from a starting speed to an operating speed and thereafter maintains the press at the desired operating speed. A related object is to provide such a control system where both the starting speed and operating speed can be selected by an operator.

A further object of this invention is to provide an automatic acceleration control system which has a high current, low impedance output readily compatible with the high current, low impedance, electrically responsive, coupling members frequently used on power presses to provide controlled transmission of torque from the press drive motor to the press flywheel.

A further object of the invention in one of its embodiments is to provide a closed loop power press acceleration control system.

Finally, it is an object of the present invention to provide an automatic control system capable of governing the acceleration of the presses in a synchronized power press line.

Other objects and advantages of the invention will become apparent upon reading the following detailed description with reference to the drawings, in which:

FIG. 2 is a diagrammatic perspective view of the drive mechanism for one press in the line;

FIG. 3 is partially in schematic and partially in block form to show the control signal supply and control signal regulator circuit for the motorized embodiment of the invention;

FIG. 4 illustrates the speed control circuit for the motorized embodiment;

FIG. 5 illustrates the phase error detector portion of the correction system used to maintain synchronization between the presses of the synchronized line;

FIG. 6 is a simplified circuit diagram of a discriminator suitable for use in the correction system;

FIG. 7 is a simplified block diagram of the solid state embodiment of the acceleration control system;

FIG. 8 illustrates a typical speed reference circuit for the embodiment shown in FIG. 7;

FIG. 9 is a simplified circuit diagram showing the passive network to sum the synchronizing signal with the speed control voltage to derive the corrected speed control signal in the solid state embodiment;

FIG. 11 shows the console D.C. motor of the solid state embodiment as the load for the control circuit of FIG. 10;

FIG. 12 shows the eddy current clutch coil of one of the line presses as the load for the control circuit of FIG. 10.

While the invention is described in connection with a particular embodiment, it will be understood that there is no intent to limit it to that embodiment. To the contrary, the intent is to cover the various alternatives, equivalents, and modifications included within the spirit and scope of the appended claims.

TYPICAL ENVIRONMENT

The invention is described with reference to its application to a synchronized line of power presses for such an environment well illustrates the utility of the present invention. However, as the description proceeds, it will become increasingly apparent that the control system can just as well be used with a single press. Only a brief description of the press line is necessary to an understanding of the present invention. For a detailed description thereof, reference is made to Patents 3,119,-439 and 3,119,443 both issued to James C. Danly and assigned to the instant assignee.

Figure 1:
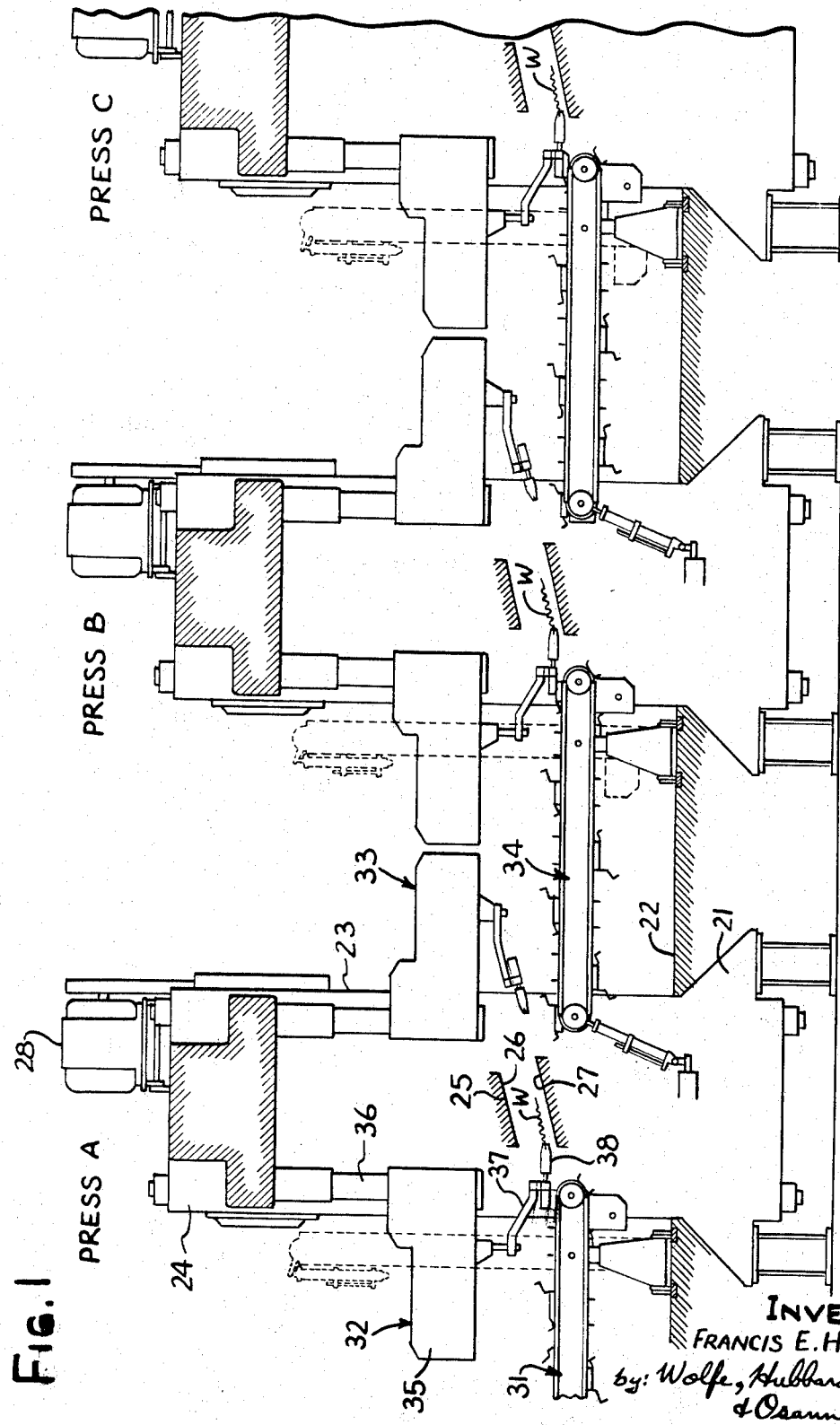
FIGURE 1 is a side elevation, partly diagrammatic, showing a portion of a typical synchronized press line suitable for control by the present invention.

Referring now to the drawings, and particularly to FIG. 1, there is shown a portion of an automated press line intended to perform successive operations upon a workpiece W which may, typically, be an automotive radiator grill. Only three presses have been shown, identified as presses A, B and C. However, it should be understood that in practice the line may be extended to include any number of similar units. The presses shown are all identical and, therefore, for a typical illustration reference is made to press A. Press A includes a massive base 21 extending below the floor 22 and an upwardly extending frame 23 topped by a crown 24. Reciprocatingly mounted within the press frame 23 is a slide diagrammatically illustrated by 25 with associated upper and lower dies 26 and 27. Slide 25 is driven by a press drive motor 28.

The workpieces are carried from press to press by conveyors which extend between the successive presses, and each press includes an input transfer mechanism for loading a workpiece from the conveyor on the input side of the press into the press work area and an output transfer mechanism for unloading the workpiece from the press work area to a conveyor on the output side of the press. Thus, workpiece W is taken from a conveyor 31 by an input transfer mechanism 32 and positioned thereby between the dies 26 and 27. After the desired press A operation has been performed, the workpiece W is removed from between the dies 26 and 27 by the transfer mechanism 33 and placed on a conveyor 34 to continue down the remainder of the press line.

The input and output transfer mechanisms are substantial duplicates of one another, differing only in programmed movement. Therefore, primary reference is made to the input transfer mechansim 32 which includes a supporting frame bracket 35 cantilevered from a post 36 which is suspended vertically from the crown 24. Depending from the bracket 35 there is a transfer arm 37 to which a workpiece gripper 38 is fixed.

The movement of the transfer arm 37 is programmed so that the gripper 38 follows a predetermined path between the conveyor 31 and the press work area between dies 26 and 27. For a complete understanding of the mechanism responsible for this programmed movement and of the operation of gripper 38, reference is made to the aforementioned patents.

The action of the press slide 25, the conveyors 31 and 34 and the transfer mechanisms 32 and 33 are all synchronized so that the input transfer mechanism 32 picks up each workpiece W as it comes down the conveyor 31 and places it in the press work area while the slide 25 is in the upper portion of its stroke. Likewise, the output transfer mechanism 33 removes workpiece W from the press work area after the press A operation has been performed and while the slide 25 is in the upper portion of its stroke and places it on the conveyor 34 to continue its journey down the line. The necessary drive to obtain this coordinated action is provided by the press drive mechanism shown in FIG. 2 which, for present purposes, need be described in only the briefest detail, reference being made to the above-identified patents for a full understanding of this mechanism.

In FIG. 2 the press drive motor 28 is shown as driving a press flywheel 41 through a speed step-down coupling 42 and an electrically responsive, torque transmitting, coupling member 43 which is energized in the illustrated embodiment through slip rings 44 and 45. The energization of the coupling member 43, typically an eddy current clutch, controls the transmission of the output torque of the motor 28 to the press flywheel 41. The connection of the motor 28 to the press drive shaft 46 is completed through the main press clutch 47, which is typically a pneumatic clutch. The press drive shaft 46 terminates in an output pinion 51 which drives a pair of intermediate gears 52 and 53 which, in turn, mesh with the main press drive gears 54 and 55, respectively.

Power for the coordinated drive of the conveyors 31 and 34 and the transfer mechanisms 32 and 33 is supplied by a shaft 56 which carries a power take off pinion 57 meshed with the main press drive gear 55. One end of the shaft 56 is coupled to the drive shaft 61 of the transfer mechanism 32, to the drive shaft 62 for the conveyor 31 and to a receiving synchro or selsyn RA used to maintain the synchronism between the various presses in the line. In a similar manner, the other end of the shaft 56 is coupled to the drive shaft 64 of the transfer mechanism 33 and to the drive shaft (not shown) of the conveyor 34.

DESCRIPTION OF THE ILLUSTRATED EMBODIMENTS

Having reviewed the construction of the presses in a typical synchronized press line and the construction of a suitable press drive mechanism, attention can now be turned to the press acceleration control system of the present invention. In accordance with the invention, acceleration control is provided by connecting the drive motor 28 to the press flywheel 41 through an electrically responsive, variable torque transmitting member, such as an eddy current clutch 43, and by energizing the torque transmitting member to obtain a predetermined press acceleration curve profiled so that the instantaneous and average accelerations encountered are well within the capabilities of the press to withstand. Of course, it should be undestood that the permissible instantaneous and average acceleration levels vary between different presses, but a typical press such as described heretofore can withstand instantaneous accelerations up to roughly 600 strokes per minute per minute and average accelerations up to approximately 7.5 strokes per minute per minute.

In choosing the particular acceleration profile, the desire is to bring the average acceleration level as close to the permissible level as possible without encountering damagingly high instantaneous accelerations. In accordance with an important aspect of this invention, this is done by allowing the press to freely accelerate to a relatively low starting speed and, thereafter, to controllably accelerate to a higher operating speed. The limiting factor on the maximum permissible press starting speed is the ability of the press to reliably withstand the shock attendant to starting at such speed without mechanical failure. As a typical example of the operation of this factor, the press previously described can be started at approximately 13 strokes per minute. On the other hand, due to the high inertia load provided by the flywheel and remainder of the press, the limiting factor on the controlled acceleration up to an operating speed of, typically, 15 strokes per minute or more is the capacity of the press motor. Specifically, the time rate of change in the press speed during the period of controlled acceleration should be sufficiently low that the press motor does not draw more than approximately 150—175% rated current. In order to use the press motor capacity to the utmost, the controlled acceleration is preferably substantially constant at a level causing the press motor to draw close to the maximum permissible current.

(A) *Motorized embodiment.*—Referring now to FIG. 3 which shows the control signal supply and regulating circuits of the motorized version of the present invention, it should be noted that any number of presses may be simultaneously controlled and that, regardless of the number of presses, the control signal supply and regulating circuits of the motorized embodiment are as described below with reference to the control of presses A and B.

Presses A and B each have an associated speed control circuit, 101 and 102, respectively, through which their respective electrically responsive, variable coupling members 43 (FIG. 2) are energized. In order to identically control the speed and acceleration of presses A and B so as to minimize the problem of maintaining synchronization therebetween, speed control signals are fed to the control circuits 101 and 102 through respective substantially identical transformers 103 and 104 which have respective primary windings 105 and 106 connected in parallel across the supply of speed control signals.

The supply of speed control voltage is shown to be a variable autotransformer 107 which has its primary circuit coupled across a suitable source of A.C., typically, 115 v. at 60 c.p.s., between the lines $L_1$ and $L_2$, and its variable secondary circuit coupled in parallel with the primary windings 105 and 106 between a slider 108 and the common line $L_2$. Of course, those skilled in the art will appreciate that other controllable, variable voltage devices, for example, a variable voltage divider, could be used.

In order to control the maximum starting speed, acceleration and operating speed of presses A and B, the voltage and time rate of change of voltage developed across the secondary circuit of transformer 107 are precisely regulated by a speed control signal regulator. The regulator is formed by a reversible D.C. motor 109 which is connected to drive the slider 108, a comparator circuit 111 which provides an output signal to indicate that a change in the magnitude of the speed control signal is required, a gate circuit 112 which is activated in response to the comparator output signal, and a motor energization circuit 113 which responds to activation of the gate circuit 112 to energize the motor 109 for rotation in the direction necessary to drive the slider 108 to produce the required change.

During preparation for line starting (i.e., before the push button 114 is depressed to energize the relay S) the control signal regulator is conditioned by the closed position of the normally closed contact sets $S_1$–$S_4$ and the opened position of the normally open contact sets $S_5$–$S_8$ to actuate the motor 109 to automatically position the slider 108 so that the speed control signals applied to the control circuits 101 and 102 do not exceed a predetermined maximum permissible starting speed voltage. Then, when the start command is given, as by depressing the push button 114, the relay S is energized to transfer the contact sets $S_1$–$S_8$ and to engage the main press clutch 47 for each of the presses by closing the normally open contact set $S_9$ in each of the main clutch control circuits 115 (FIG. 4). The control signal regulator is then conditioned by the open position of the normally closed contact sets $S_1$–$S_4$ and the closed position of the normally open contact sets $S_5$–$S_8$ to activate the motor 109 to drive the slider 108 so that the voltage across the secondary circuit of autotransformer 107 increases with a substantially constant time rate of change to cause the presses to controllably and linearly accelerate up to a predetermined line operating speed.

More specifically, the comparator circuit 111 includes a transformer 121 which has its primary winding 122 connected in parallel with the primary windings 105 and 106 to produce a voltage across the secondary winding 123 which is proportional to the instantaneous voltages applied to the speed control circuits 101 and 102. The factor of proportionality will be assumed hereinafter to be unity. However, those skilled in the art will appreciate that the line starting and operating speed reference voltages can be proportioned to other factors. The signal across the secondary winding 123 is converted to a proportional D.C. voltage by a bridge rectifier 124, and the proportional D.C. voltage is smoothed by a filter capacitor 125 and dropped across a resistor 126. The comparator circuit 111 also includes a second transformer 131 which has its primary winding 132 connected between the lines $L_1$ and $L_2$ and its secondary winding 133 connected across the input of bridge rectifier 134. The output of bridge rectifier 134 is smoothed by a filter capacitor 135 and dropped across a resistor 136 and the parallel combination of a line starting speed potentiometer 137 and a line operating speed potentiometer 138. The settings of the sliders 141 and 142 on potentiometers 137 and 138, respectively, establish the line starting and operating speed reference potentials, respectively.

Comparator circuit 111 includes a pair of unidirectional paths both of which pass through the comparator output circuit. One of these, the path including the diodes 145 and 146 is normally closed by contact set $S_1$ and poled to provide firing bias to the gate-cathode circuit of silicon controlled rectifier 147 whenever the drop across resistor 126 is larger than the line starting speed voltage between slider 141 and comparator circuit common 148. Thus, prior to the engagement of the press clutch 47, the output circuit of comparator 111 is energized so long as the comparison signal across the resistor 126 is greater than the starting speed reference signal provided by potentiometer 141. As a result, as will become clearer, the magnitude of the speed control signal applied to the control circuits 101 and 102 is automatically reduced to a safe starting speed level prior to press starting. The other unidirectional path of the comparator circuit is normally held open by the contacts $S_5$ and includes diodes 151 and 152 which are poled to provide firing bias to the gate-cathode circuit of the controlled rectifier 147 when the comparison signal provided across the resistor 126 is less than the operating speed reference potential developed between the slider 142 and the comparator circuit common 148. Thus, subsequent to the engagement of the press clutch, the comparator output circuit is energized until the speed control signal reaches the predetermined operating speed level. Noise is eliminated from this bias current by a RC filter 153, and the level of the bias current is limited to protect the controlled rectifier 147 by a diode string 154.

In order to energize the motor 109 in response to the firing of the silicon controlled rectifier 147, a relay ACC is connected in the anode-cathode circuit of the controlled rectifier 147 and an associated set of normally open contacts $ACC_1$ is connected in the motor energization circuit 113. Anode-cathode bias for the controlled rectifier 147 and energization current for the relay ACC are provided by a transformer 155 and a half wave rectifier 156. Relay holding current is provided by a capacitor 157.

When the relay ACC, is energized, the normally open contact set $ACC_1$ is closed to connect a bridge rectifier 161 in the motor energization circuit across lines $L_1$ and $L_2$. During preparation for line starting, this connection is completed through the secondary circuit of an autotransformer 162, and current flows through the armature of the motor 109 in a direction to cause the motor to drive the slider 108 toward the right-hand end of the autotransformer 107 to reduce the voltage applied to the speed control circuits 101 and 102. The rate at which the speed control signal is reduced is determined by the setting of a slider 163 on the autotransformer 162. Subsequent to line starting, the connection of the bridge rectifier 161 between the lines $L_1$ and $L_2$ is completed through the secondary circuit of an autotransformer 164, and current flows through the motor armature in a direction to cause the motor 109 to drive the slider 108 toward the left-hand or high voltage end of the autotransformer 107 to increase the voltage applied to speed control circuits 101 and 102. The rate at which the speed control signal is increased is determined by the setting of a slider 165 on autotransformer 164. This arrangement permits the use of substantially the full capacity of the press motor 28 since the time rate of change in the speed control voltage, or, in other words, the press acceleration from the starting speed to the operating speed is substantially constant.

Energization for the field winding 167 of motor 109 is provided by a bridge rectifier 168 which is connected across the lines $L_1$ and $L_2$.

Many power presses presently in the field are equipped with an electrically responsive, torque transmission controlling, coupling member 43 interposed between the press motor 28 and flywheel 41 (FIG. 2). The coupling member may be located either as shown or, as is more frequently the case, between the press motor 28 and the input of the step-down mechanism 42. Generally, the torque transmission controlling coupling members employed are high current, low impedance devices, such as eddy current clutches. Therefore, in order to obtain the current levels necessary to control such a device, a two stage amplifier is used.

As shown in FIG. 4, the first amplifier stage is formed by a conventional magnetic amplifier 200. The speed control signal from the supply of FIG. 3 is converted to a proportional D.C. voltage by a bridge rectifier 201 and this voltage is smoothed by a filter capacitor 202 before being applied across the control input or speed voltage input 203 of the magnetic amplifier. A trimming rheostat 205 may be used to provide any compensation necessary due to irregularities in the transformers used to couple the speed voltage to the clutch control circuits of each of the line presses. For the purpose of providing bias to amplifier 200, the primary winding 206 of a transformer 207 is connected across the lines $L_1$ and $L_2$ and the secondary winding 208 is coupled to the bias input 209 of the amplifier 204 through a rectifier 211 and a bias level setting rheostats 212. A capacitor 213 serves to smooth this bias. The reference or phase voltage input 214 of the amplifier 200 is connected through leads 215 and 216 to receive the phase correction voltage output of the discriminator shown in FIG. 6. As will become clearer in connection with FIGS. 5 and 6, this phase correction voltage is a synchronizing signal which maintains the press in synchronization with the other presses in the line by decreasing the press speed if the press tends to run faster than the line operating speed and by increasing the press speed should it tend to run slower than the line operating speed.

The second amplifier stage 221 is a conventional solid state power amplifier. Silicon controlled rectifiers 222 and 223 and uncontrolled rectifiers 225 and 226 form a controlled bridge rectifier the output of which is fed to the eddy current clutch slip rings 44 and 45. The anode-cathode or firing circuit of the controlled rectifier 222 is connected between the magnetic amplifier output terminals 231 and 232 while the firing circuit of the controlled rectifier 223 is connected across the output terminals 233 and 234 of amplifier 200. Resistors 235 and 236, which are connected across the gate-cathode circuits of the rectifiers 222 and 223, respectively, provide a path for reset current and insure that the associated rectifier turns off during the reverse portion of the power cycle.

The power amplifier 221 provides the necessary current amplification since as little as 50 milliamperes from the magnetic amplifier 200 is capable of controlling up to 25 amperes or more. Additionally, the power amplifier has the sensitivity necessary to react to changes in the output level of the magnetic amplifier 200 to change the level of current flow through the eddy current clutch 43. Specifically, as the outputs from magnetic amplifier increase in amplitude, the amplifier 221 is biased for conduction for an increasing portion of the positive half-cycle of the signal between the lines $L_1$ and $L_2$. Thus, as the speed control signal applied to the amplifier 200 increases, a larger amount of current is permitted to flow through the eddy current clutch 43 and clutch slippage is thus reduced as more speed is called for by the speed control signal. Conversely, as the output of amplifier 200 drops to indicate that less speed is called for, amplifier 221 conducts later in the power half-cycle and, therefore, less current flows through the clutch 43 and the slippage is increased. Accordingly, it can be seen that the output level of the magnetic amplifier 200, which is proportional to the speed control signal as corrected by the phase voltage, precisely controls the amount of slippage provided by the clutch 43 and, hence, the speed of flywheel 41. Additionally, the time rate of change of the output level of amplifier 200 controls the time rate of change in the clutch slippage and, thus, the rate of acceleration of flywheel 41.

A conventional phase error detection system is used to maintain the synchronization between the various presses in the line.

Referring to the phase error detector portion of the system, shown in FIG. 5, a transmit-receive synchro arrangement is shown for each of presses A and B. The rotors 241 and 242 of the transmitting synchros TA and TB, respectively, are both mechanically coupled for rotation with the shaft of a variable speed D.C. motor 243 and energized by an A.C. signal, conveniently the signal between lines $L_1$ and $L_2$. The rotors 244 and 245 of the receiving synchros RA and RB are coupled for rotation with the drive for presses A and B, respectively (typified by the drive connection to receiver RA shown in FIG. 2). The stator windings 251–253 of the transmitter TA are connected in star formation and with the similarly connected stator windings 254–256 of the receiver RA. Likewise, the stator windings 261–263 of the transmitter TB are connected in star formation and with the similarly arranged stator windings 264–266 of the receiver RB. The operation of such a transmitter-receiver synchro arrangement is well understood. Suffice for present purposes to note that any lead or lag between the rotor of a receiving synchro and the rotor of its associated transmitting synchro results in a signal across the receiver rotor winding which varies in phase depending on whether the receiver rotor leads or lags the transmitter rotor and in magnitude depending on the amount of this phase displacement.

In order to provide a reference phase, the transmitter rotors RA and RB are rotated by motor 243 at the instantaneous line speed as determined by the speed control signal being fed to speed control circuits 101 and 102. To provide armature current for the motor 243 which is directly proportional to this speed control signal, a transformer 270 has a primary winding 271 connected in parallel with the primary windings 105 and 106 of the clutch speed control circuit input transformers 103 and 104, respectively (FIG. 3). The secondary winding 272 of transformer 270 is connected across the input of a console motor speed control circuit 273. The motor speed control circuit 273 is typically a two stage amplifier such as previously described with reference to FIG. 4 with the exception that the reference voltage is fixed. Accordingly, this circuit is not separately shown in detail. As will be understood by those skilled in the art, the armature current vs. speed characteristic of the motor 243 should be linearly related to the excitation current vs. output speed characteristic of the clutch 43, and the factor of proportionality is chosen so that for any given speed control signal, the speed of the motor substantially equals the output speed of the clutch.

The rotor windings 244 and 245 are connected across the inputs of respective discriminators so that the A.C. signals developed across the rotor windings are converted to D.C. voltages of corresponding phase and magnitude. A suitable discriminator for this purpose is shown in FIG. 6 as connected across terminals $x$—$x$ of the winding 244, is being understood that a similar discriminator is provided for the rotor winding 245.

The discriminator includes an input transformer 281 which has a primary winding 282 connected across rotor winding terminals $x$—$x$ and a center tapped secondary winding 283 feeding the base-emitter input circuits of a pair of transistors 284 and 285. The collector-emitter output circuits of the transistors 284 and 285 are energized through respective load resistors 286, 287 and reverse current blocking protective diodes 288, 289 by the voltage developed across the secondary winding 291 of a transformer 292. The primary winding of transformer 292 is energized by the same A.C. signal applied to the rotor winding of transmitting synchro TA. The capacitors 293 and 294 serve as ripple filters.

Where the rotors 241 and 244 of transmitting synchro TA and of receiving synchro RA, respectively, are rotating in phase, a balance condition exists and no output signal appears across the load resistors 286 and 287. However, upon departure from the in phase condition, an A.C. input signal of either direct or opposite phase, depending upon whether the rotor of the receiving syncro RA is leading or lagging the rotor of the transmitting synchro TA, is applied across the discriminator input. Where the input signal is of direct or "leading" phase, conditions are met for conduction of one of the transistors, say transistor 284, thereby producing a D.C. voltage across the load resistor 286. Conversely, when the input signal is of opposite or "lagging" phase, conditions are met for conduction in the other transistor, transistor 285, and a D.C. voltage is produced across the load resistor 287.

In the motorized embodiment, the discriminator output is applied across the phase voltage input 214 of magnetic amplifier 200 as a synchronizing signal where it is combined with the speed control signal applied to the control input. As a result, a corrected speed control signal is applied to the coupling member 43.

(B) *Solid state embodiment*.—The solid state embodiment of the present invention, like the motorized version, provides controlled press acceleration and is entirely suitable for controlling the acceleration of the various presses in a synchronized power press line. Further, the high current, low impedance output of the solid state speed control circuit is compatible with the eddy current clutches presently employed on many power presses. However, the solid state embodiment has certain very desirable characteristics of its own. Among these are a very fast response time due to the use of the solid state circuitry and a high degree of stability due to the closed loop nature of the system.

Turning now to FIG. 7, which is a block diagram of the solid state embodiment, it can be seen that all the presses in the synchronized line are fed with identical speed control signals, these signals being developed across the secondary windings of a multi-secondary transformer shown diagrammatically at 301. Only two presses, presses A and B, have been indicated, but it will be readily appreciated that the number of presses which can be simultaneously controlled is virtually unlimited.

The control and drive arrangements for the respective line presses are preferably identical, and, therefore, a description of the press A control and drive mechanism 302 will suffice. Further, since the drive mechanism 303 is typically the same as previously described relative to FIG. 2, it is shown in simplified block form.

The energization circuit 305 for the variable coupling member 304 is a closed loop system providing precise control over the energization of the coupling member so that the press speed closely follows the speed called for by the acceleration control system. Thus, the variable coupling member energization circuit 305 includes a speed control circuit 306 which is responsive to an actual press speed signal and to a corrected speed control signal to energize coupling member 43 only when the press speed called for by the corrected speed control signal is greater than the actual press speed. To provide the actual press speed signal, a tachometer 307 is fixed for rotation with the press flywheel and the output thereof is fed to the speed control circuit input 308 through a bridge rectifier 309. To provide the corrected speed control signal, the speed control voltage developed across the press A secondary winding of the transformer 301 is rectified by a bridge rectifier 311 and corrected by a phase error detection system 312 before being applied to the speed control circuit input 313. The phase error detection system 312, which may be formed by the phase error detector and discriminator previously discussed with reference to FIGS. 5 and 6, respectively, provides correction by either decreasing or increasing the speed control signal depending on whether phase of press A is leading or lagging a line reference phase. The normally closed contacts $D_1$ may be used to shunt this system during preparation for line starting.

The press drive mechanism 303, and particularly the flywheel 41 provide a high intertia load. Therefore, under conditions of acceleration, especially where the magnitude of the corrected speed control signal is considerably greater than the magnitude of the actual press speed signal, there is a danger that the motor 28 will tend to draw damagingly high current. Therefore, to protect the motor, the current in one of its three phase inputs is sensed by a motor protector circuit 314 which acts to cut off the clutch speed control circuit 306 when the detected current raises above a predetermined maximum permissible level. This level is chosen to be at approximately 150–175% of the rated current capacity of motor 28.

A second speed control circuit 320 is used in a closed loop system to precisely control the shaft speed of a console D.C. motor 321 in accordance with the speed called for by a speed reference voltage. To this end, the speed control circuit 320 provides armature current for the motor 321 only when the speed called for by the reference actual motor speed. In order to provide a signal corresponding to the actual speed of the motor 321, a tachometer 323 is mounted to rotate with the shaft of the motor 321 and the tachometer output is supplied to the input 323 of motor speed control circuit 320 through a full wave rectifier 325.

During preparation for line starting (i.e., before the relay R is energized), a predetermined A.C. reference potential is applied as a starting speed control voltage across each of the secondary windings of transformer 301. This voltage is supplied by an A.C. starting voltage reference source 331 through a normally closed set of contacts $R_2$ and an A.C. amplifier 332. At the same time, a D.C. line starting speed reference voltage is applied from a speed reference circuit 333 to the input 322 of the speed control circuit 320 through the normally closed contacts $R_3$.

Since the output signal of the tachometer 323 provides a measure of the speed of the motor 321, the tachometer output can be compared with the signal provided by the A.C. starting speed reference source 331 by a relay control circuit 334 to automatically energize the relay R when the speed of the motor 321 reaches the line starting speed. The energization of the relay R causes the normally closed contacts $R_1$–$R_3$ to transfer to an opened position and the normally opened contacts $R_4$–$R_6$ to transfer to a closed condition. As a result, the motor 321 is brought under the influence of the line operating speed reference voltage supplied by the speed reference circuit 333 through the contacts $R_5$ and the speed control signals developed across the secondary windings of the transformer 301 are provided by the output of the tachometer 323 through the A.C. amplifier 332.

The speed reference circuit is shown in FIG. 8. The line starting speed reference voltage is developed across the portion of the potentiometer 342 selected by the slider 343 while the line operating speed reference voltage is developed across the portion of the potentiometer 344 below the slider 345. Additionally, and in accordance with an important aspect of this invention, the energization of the relay R does not immediately apply the full line operating speed voltage to the speed control circuit 320. Rather, the selected portion of the potentiometer 344 and a capacitor 346 connected across the output of the reference circuit 333 form a time constant circuit. Thus, when the relay R is energized to initiate line acceleration from the starting speed to the operating speed, the voltage across the capacitor 346 increases from the line starting speed voltage to the line operating speed voltage along the predetermined charging curve of the RC time constant circuit formed. Accordingly, as will later become clearer, the time rate of change of the speed

11 control voltages is provided by tachometer 323, and, therefore, the acceleration profiles of the time presses are governed by the charging curve of this time constant circuit. Preferably, in order to take advantage of the full capacity of the press motor 28, the time constant of the RC circuit is sufficiently long that the voltage build up across the capacitor 346 from the starting speed to the operating speed is substantially linear. At any rate, the time rate of change in the voltage across the capacitor during charging from the starting to operating speed levels must be low enough that the press motor can provide a related press acceleration.

FIG. 9 shows how the phase correction output of the phase error detection system 312 is summed with the speed control signal to derive the corrected speed control signal. As can be seen, the speed control signal provided across the press A secondary winding 351 of the transformer 301 is rectified by a bridge rectifier 311 and filtered by a smoothing capacitor 352 before being summed with the voltage appearing across the summing resistors 354 and 355 which are connected across the discriminator load resistor 286 or 287, respectively (FIG. 6). If the phase detector (FIG. 5) senses that press A is leading, the discriminator produces a voltage across the summing resistor 354 which has a subtractive effect on the speed control voltage. On the other hand, if press A is lagging, a voltage is produced across the summing resistor 355 which additively combines with the speed control voltage. A trimming rheostat 356 is used to provide compensation for any variance of the press A secondary winding 351 from the other press secondary windings.

The clutch speed control circuit 306 and the console motor speed control circuit are typically identical. Therefore, the control circuit shown in FIG. 10 will be described with reference to its use in controlling eddy current clutch 43, it being understood that the description applies equally well to its use in controlling the console D.C. motor 321, the only differences being differences in inputs and loads. Specifically, the description of the circuit of FIG. 10 with reference to its use as the control circuit 306 can be correlated with its use as the control circuit 320 by observing that the output of the speed reference circuit 333, like the corrected speed control signal, is applied between terminals 398 and 399, that the output of the tachometer 323 is applied in the same manner as the output of the tachometer 307, and that the D.C. motor armature circuit (FIG. 11) is connected across the circuit output in the same manner as the clutch coil (FIG. 12).

Figure 10:
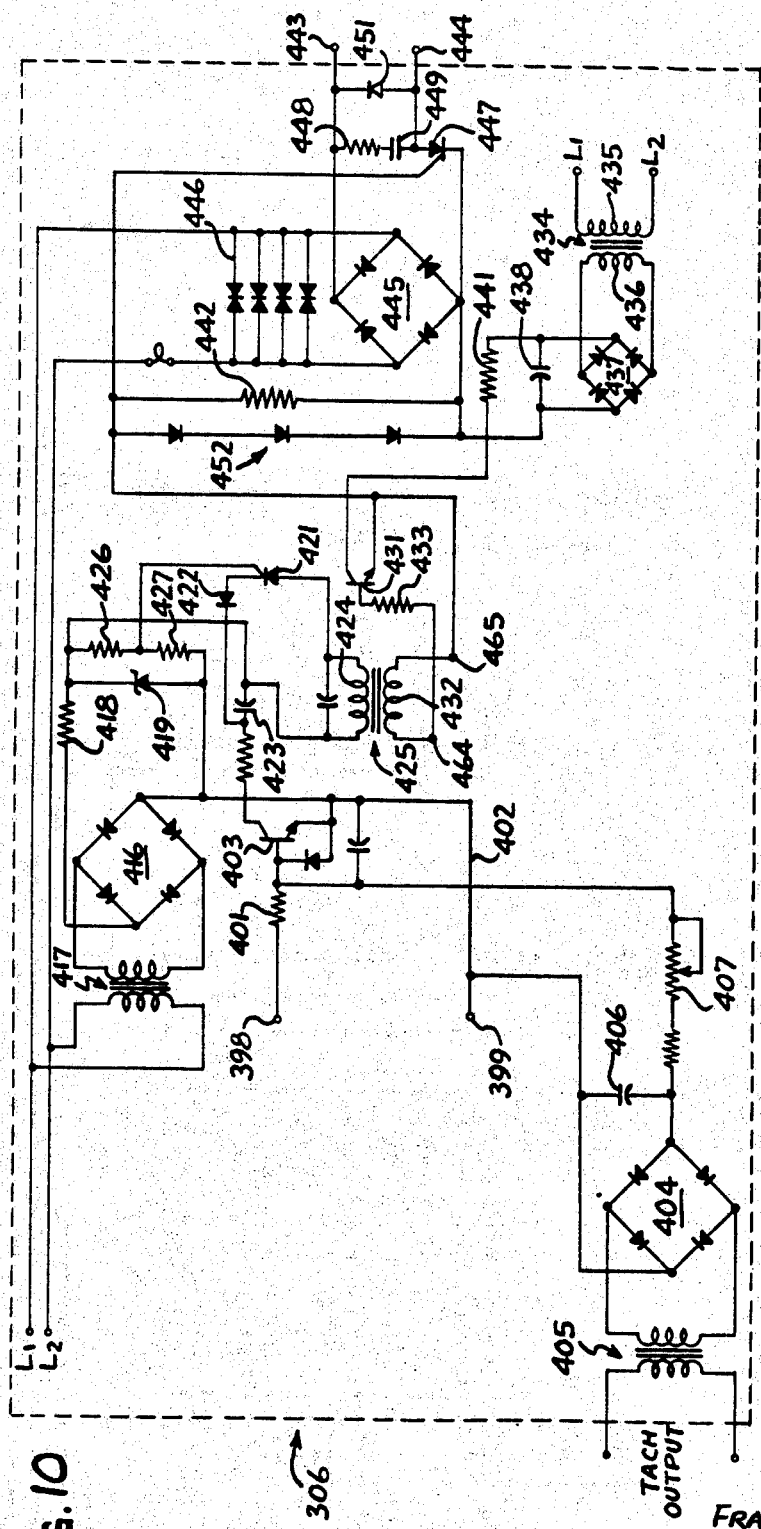
FIG. 10 shows a circuit which may be used with the speed reference circuit and console D.C. motor as the speed control signal magnitude regulator, and with the summing network of FIG. 9 as the speed control circuit for the solid state embodiment of the invention.

With this introduction, attention can now be turned to the details of FIG. 10. The corrected speed control voltage developed at the output of phase error detector system 312 is applied between the terminals 398 and 399. Terminal 398 is connected through a current limiting resistor 401 to the base of a transistor 403 and the input circuit is completed through the transistor emitter and a common lead 402. The corrected speed control signal has a polarity which tends to render the transistor 403 conductive. However, in order to prevent energization of eddy current clutch 43 when press A is already rotating as fast as the speed called for by the corrected speed control signal, an actual press speed voltage is applied across the base-emitter circuit of the transistor 403 with a polarity tending to back bias the base-emitter junction. To provide this actual press speed voltage, the output of tachometer 307 is coupled to the input of a bridge rectifier 404 through a transformer 405, and the rectified tachometer output is smoothed by a filter capacitor 406 before being coupled between the base and common emitter of the transistor 403 through a trimming rheostat 407. It will of course be understood that when the control circuit of FIG. 10 is utilized as the clutch speed control circuit 306 of FIG. 7, the bridge rectifier 404 of FIG. 10 corresponds to the rectifier 309 of FIG. 10. Likewise, when the FIG. 10 circuit is used as the motor controller

12

320 of FIG. 7, the rectifier 404 corresponds to the rectifier 325.

If the amplitude of the actual speed voltage is greater than the amplitude of the corrected speed control signal, the press speed is already as high as desired. In that event, the base-emitter junction of the transistor 403 is back biased and, as a result the clutch 43 is de-energized. On the other hand, when the base-emitter junction of the transistor is forward biased, more press speed is called for and to provide the increased press speed, the clutch 43 is conditioned to transmit torque from the motor 28 to the flywheel 41.

The collector-emitter circuit of transistor 403 is energized with substantially a square wave potential. To provide this potential, the lines $L_1$ and $L_2$ are coupled to the input of a bridge rectifier 416 through a transformer 417, and the output of the rectifier 416 is developed across a dropping resistor 418 and a Zener diode 419. Zener diode 419 provides the desired degree of squaring by clipping the peaks of the dropped output of the bridge 416.

To provide amplification of the output of the transistor 403, a silicon controlled rectifier 421 has its anode-cathode firing circuit connected in the collector-emitter circuit of transistor 403 through a reverse voltage blocking protective diode 422, a frequency multiplying capacitor 423 and a primary winding 424 of a coupling transformer 425. The gate of controlled rectifier 421 is connected to a point of firing bias potential between a pair of voltage divider resistors 426 and 427. The frequency multiplication action of the capacitor 423 can be seen to begin as soon as the transistor 403 is rendered conductive. Thus, at the initial instant of transistor conduction, the anode and cathode of the controlled rectifier 421 are substantially at the same potential, and the rectifier is, accordingly, held non-conductive. Subsequently, the capacitor 423 charges to a potential sufficient to fire the rectifier 421 and the capacitor 423 proceeds to discharge through the controlled rectifier until the anode-cathode drop is no longer sufficient to maintain conduction. This process then repeats with the frequency being determined by the time constants of the charging and discharging circuits of the capacitor 423. In this manner, relatively high frequency voltage spikes are produced across the primary winding 424 of the transformer 425 at a relatively high frequency responsive to the conduction of transistor 403.

In order to further amplify the spikes developed across the primary winding 424, the base-emitter circuit of an amplifying transistor 431 is connected across the associated secondary winding 432 through a current limiting resistor 433. To provide supply potential for the transistor 431, a transformer 434 has its primary winding 435 connected to the A.C. lines $L_1$ and $L_2$ and its secondary winding 436 connected to the input of a bridge rectifier 437. The output of the bridge rectifier 437 is smoothed by a filter capacitor 438 and applied across the emitter-collector circuit of transistor 431 through a dropping resistor 441 and an emitter load resistor 442.

To provide energization for the clutch coil (FIG. 12), which is connected across the control circuit output terminals 443 and 444, a bridge rectifier 445 is connected across lines $L_1$ and $L_2$. A series of parallel selenium rectifiers 446 are connected across the input of the rectifier as surge current suppressors. To provide the desired control so that the clutch coil is energized as soon as, but only when, more press speed is called for, the connection of the clutch coil to bridge 445 is completed through the anode-cathode firing circuit of a silicon controlled rectifier 447. Controlled rectifier 447 has its gate-cathode bias circuit connected across the emitter load resistor 442 so that it is fired only when the increased speed requiring pulses appear across the load resistor.

The clutch coil (as well as the motor armature) provides a highly inductive load across the output terminals 443 and 444. Therefore, in order to enable controlled rectifier 447 to draw the necessary latching current, a resistor 448 and a capacitor 449 are coupled in series across the output terminals 443 and 444. Likewise, in order to provide a discharge path for current stored in the inductive load, a free wheeling diode 451 is also connected across the output load. Finally, to provide protection for the gate-cathode junction of the rectifier 447, a current limiting diode string 452 is connected in parallel therewith.

In the interest of completeness, one possible modification of the acceleration control system should be mentioned. That is, it is possible to run one or more of the presses in the line as masters and the remainder as slaves. This is done by controlling the speed and time rate of speed change of the master presses in the same manner as described with reference to the control of press A. However, the slave presses are controlled, not in response to the speed control signal provided by the common speed control signal supply, but in response to a control signal derived from a tachometer driven by a master press. This rectified and filtered master press tachometer output is applied to the slave press control circuit across the same points described previously with reference to the application of the speed control voltage, the corrected speed control signal for the slave press is derived by combining the speed change of the master presses in the same manner as previously discussed.

Figure 13:
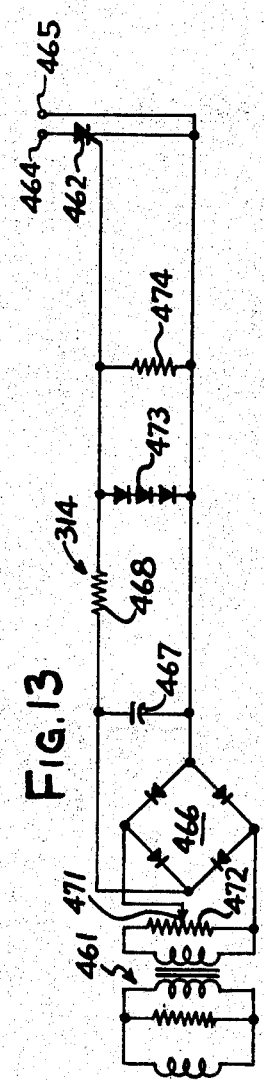
FIG. 13 is a circuit diagram of the motor protector circuit shown in block form in FIG. 7.

Turning finally to FIG. 13 and the details of the motor protector circuit 314, it can be seen that a current transformer 461 is connected to one of the drive motor input leads L₃ and that a silicon controlled rectifier 462 has its anode-cathode firing circuit connected across the secondary winding 432 of the coupling transformer 425 through a pair of terminals 464 and 465. In this manner, the secondary winding 432 is substantially shorted by the low anode-cathode impedance of the rectifier 462 when the latter is fired and, thus conduction of transistor 431 is prevented. In order to condition the controlled rectifier 462 for firing when motor 20 starts to draw damagingly high current, a portion of the output of the current transformer 461 is rectified by a bridge rectifier 466 and smoothed by a filter capacitor 467 before being applied as a bias signal across the gate-cathode circuit of the rectifier 462 through a dropping resistor 468. The portion of the output of the current transformer 461 applied to the rectifier 466 is selected by the setting of a slider 471 on a potentiometer 472 so that the rectifier 462 is fired as soon as the motor 20 begins to draw objectionably high current, say more than about 150–175% rated. A diode string 473 provides current protection for the gate-cathode junction of rectifier 462 while a low value resistor 474 is used to prevent spurious firing of rectifier 462 by transients and to provide a path for reset current.

From the foregoing, it should now be clear that the present invention provides a power press acceleration control which reduces the starting shock applied to the power press thereby substantially decreasing danger of mechanical failure of the more delicate press components upon press starting. It should also be clear that the control is compatible with presently employed electrically responsive, torque transmission controlling, coupling members and suited for use with either a single press or a line of synchronized presses.

I claim as my invention:

1. In an acceleration control system for a power press including a press drive motor, a flywheel, an electrically responsive coupling member energizable for transmitting torque from said motor to said flywheel, a press drive shaft, and a press clutch engageable for coupling said flywheel to said drive shaft, said acceleration control system comprising the combination of signal supply means for providing a speed control signal having a magnitude representative of the desired flywheel speed, a speed control circuit responsive to the control signal magnitude for energizing said coupling member to transmit sufficient torque to said flywheel to permit rotation thereof at the speed represented by the magnitude of the control signal, and control signal regulating means coupled to said supply means and operable prior to the engagement of said clutch for limiting the magnitude of said control signal to a maximum predetermined starting speed level and subsequent to the engagement of said clutch for increasing the magnitude of said control signal to a higher operating speed level, the time rate of change of the magnitude of said control signal subsequent to engagement of said press clutch being sufficiently low that said press motor is capable of providing a related controlled press acceleration.

2. The acceleration control system of claim 1 wherein said press drive motor is an electric motor and further including a press motor supply circuit connected to energize said press motor and a motor input current limiting means, said current limiting means including sensing means connected to said supply circuit to detect the current level being drawn by said motor and switch means coupled to said speed control circuit and responsive to a detected current level above a predetermined maximum level to prevent energization of said coupling member.

3. The acceleration control system of claim 1 wherein said control signal regulating means includes a comparator circuit having a normally open unidirectional path and an output circuit energized by current flow in said path, first reference potential means for providing said path with a predetermined operating speed reference potential having a terminal magnitude proportional to said operating speed level and a polarity tending to forward bias said path, comparison potential means coupled to said supply for providing said path with a comparison signal having a magnitude similarly proportional to said control signal magnitude and a polarity tending to reverse bias said path, circuit conditioning means for closing said path upon engagement of said press clutch, and motor means coupled to said supply and responsive to energization of said output circuit to increase the magnitude of said control signal whereby said control signal is increased upon engagement of said press clutch so long as the magnitude of said operating speed reference potential exceeds the magnitude of said comparison signal.

4. The acceleration control system of claim 3 wherein said operating speed reference potential is substantially constant and said normally open comparator circuit path is connected between said first reference potential means and said comparison potential means through said output circuit, and further including a second reference potential means for providing a substantially constant starting speed reference potential, and a normally closed unidirectional comparator circuit path connected between said second reference potential means and said comparison potential means through said output circuit and poled for energizing said output circuit when the magnitude of said comparison signal exceeds the magnitude of said starting speed reference potential, said circuit conditioning means opening said normally closed path upon engagement of said press clutch, and wherein said motor means includes a reversible motor coupled to said supply, a first motor current supply circuit responsive to current flow through said normally closed path to energize said motor for rotation in a direction to reduce the magnitude of said control signal and a second motor supply circuit responsive to current flow through said normally open path to energize said motor for rotation in a direction to increase the magnitude of said control signal.

5. The acceleration control system of claim 4 further including a motor control relay, a common set of normally open contacts connected in said motor supply circuits and positioned to be closed by energization of said relay, and an electronic switch having a control circuit connected in said comparator output circuit and a power circuit connected across said relay whereby said switch is responsive to current flow in said output circuit to energize said relay, and wherein said reversible motor is a D.C. motor having an armature connected in said motor supply circuits, and said motor supply circuits are oppositely polarized to provide current flow through said armature in opposite directions.

6. The acceleration control system of claim 5 wherein said coupling member is an eddy current clutch and said second motor supply circuit further includes means for providing a substantially constant current whereby the acceleration of said press from its starting to operating speeds is substantially constant.

7. The acceleration control system of claim 1 wherein said supply means includes a reference source for providing a signal having a magnitude equal to said starting speed level, first normally closed circuit means for coupling said reference source to said speed control circuit, a console tachometer, and first normally open circuit means for coupling the output signal of said tachometer to said speed control circuit, and wherein said control signal regulating means includes a console motor having an output shaft coupled to drive said tachometer, a comparator having a unidirectional input circuit and an output circuit coupled to energize said console motor for increased shaft speed in response to current flow in said input circuit, first reference potential means for providing an operating speed reference signal, second normally open circuit means for coupling said operating speed reference signal to said input circuit with a polarity tending to forward bias said input circuit, operating speed reference signal magnitude control means activated by closure of said second normally open circuit means to increase the magnitude of said operating speed reference signal from a voltage proportional to said starting speed level to a voltage similarly proportional to said operating speed level, and coupling means between said tachometer and said input circuit for providing said input circuit with a comparison signal having a voltage similarly proportioned to said tachometer output signal and a polarity tending to reverse bias said input circuit, said acceleration control system further including circuit conditioning means for opening said normally closed circuit means and closing said normally open circuit means upon engagement of said press clutch whereby said press freely accelerates to said starting speed and thereafter controllably accelerates to said operating speed in accordance with the rate at which said operating speed reference signal is increased.

8. The acceleration control system of claim 7 further including a press tachometer mounted to be driven with said flywheel for providing an output signal corresponding in amplitude to the flywheel speed, and wherein said speed control circuit includes a second comparator having a unidirectional input circuit and an output circuit connected for energizing said coupling member in response to current flow in said second comparator input circuit, first signal translating means for supplying said control signal to said second comparator with a polarity tending to forward bias the input circuit thereof, and second signal translating means connected to said press tachometer for supplying the output signal of said press tachometer to said comparator with a polarity tending to reverse bias the input circuit thereof whereby said variable coupling member is energized only when the flywheel speed is less than the speed represented by the magnitude of said control signal.

9. The acceleration control system of claim 8 wherein said operating speed reference signal magnitude control means includes a capacitor connected across said input circuit, second reference potential means for charging said capacitor to said voltage proportional to the starting speed level, and second normally closed circuit means for coupling said second reference potential means to said capacitor, said second normally closed circuit means being opened upon engagement of said press clutch by said circuit conditioning means.

10. The acceleration control system of claim 9 wherein said circuit conditioning means includes a relay and a relay control circuit responsive to said reference source and said console tachometer to energize said relay when the amplitude of said console tachometer output signal rises to said starting speed level, said normally open circuit means each include a set of normally open contacts positioned to be closed by energization of said relay, said normally closed circuit means each include a set of normally closed contacts positioned to be opened by energization of said relay, and wherein the charging of said capacitor from said voltage proportional to said starting speed level to said voltage proportional to said operating speed level is substantially linear whereby the controlled acceleration of said press is substantially constant.

11. In an acceleration control system for a synchronized press line having a series of power presses for performing successive operations on a workpiece, each of said presses including a press drive motor, a flywheel, a coupling member energizable for transmitting torque from said motor to said flywheel, a press drive shaft, and a clutch engageable for coupling said flywheel to said drive shaft, said acceleration control system comprising the combination of a common supply means for providing a speed control signal having a magnitude representative of the desired line speed, circuit conditioning means activatable for engaging said press clutch, control signal magnitude regulating means responsive to the activation of said circuit conditioning means to increase the magnitude of said control signal from at least as low as a predetermined maximum starting speed level to a higher predetermined operating speed level, the time rate of change of said control signal magnitude being sufficiently low that each of said press motors are capable of providing a related controlled press acceleration, synchronizing means for each of said presses responsive to the phase position of the press drive shaft relative to a reference phase position for providing a synchronizing signal, and a speed control circuit for each of said presses for combining the speed control signal with the synchronizing signal to provide a corrected speed control signal, the speed control circuit of each of said presses responding to the amplitude of the corrected speed control signal for energizing the coupling member of such press for the transmission of sufficient torque to permit rotation of the associated flywheel at the speed represented by said amplitude whereby the acceleration of said press line from at least said starting speed to said operating speed is controlled and any tendency of the presses to get out of synchronism is corrected.

12. The acceleration control system of claim 11 wherein said synchronizing means includes a common console motor having an output shaft rotated at the desired line speed for providing a reference phase, and transmitting means and receiving means for each of said presses, each of said transmitting means being connected for rotation with said output shaft for providing a phase reference signal related to the phase position of said shaft, each of said receiving means being coupled for rotation with the drive shaft of one of said presses to provide an indication of the phase position of said drive shaft and having an output coupled to the speed control circuit of said press, the transmitting and receiving means of each of said presses being electrically interconnected to provide a synchronizing signal at said output which varies in polarity and magnitude in accordance with the direction and amount of phase displacement between said output shaft and the press drive shaft.

13. The acceleration control system of claim 12 wherein each of said speed control circuits includes an amplifier having a control input responsive to said speed control signal and a reference input responsive to said synchronizing signal whereby said amplifier combines said speed control and synchronizing signals to provide said corrected speed control signal.

14. The acceleration control system of claim 12 wherein each of said speed control circuits has a passive summing network responsive to said speed control signal and said synchronizing signal for providing said corrected speed control signal.

References Cited

UNITED STATES PATENTS 3,199,439    8/1965    Danly _____ 100—43
3,199,443    8/1965    Danly _____ 100—207

BILLY J. WILHITE, *Primary Examiner.*